United States Patent

(12) United States Patent  
Son

(10) Patent No.: US 9,281,698 B2  
(45) Date of Patent: Mar. 8, 2016

(54) BATTERY PACK

(75) Inventor: Jungsoo Son, Yongin-si (KR)

(73) Assignee: Samsung Display Co., Ltd., Gyeonggi-Do (KR)

(*) Notice: Subject to any disclaimer, the term of this patent is extended or adjusted under 35 U.S.C. 154(b) by 592 days.

(21) Appl. No.: 13/558,135

(22) Filed: Jul. 25, 2012

(65) Prior Publication Data

US 2013/0134944 A1 May 30, 2013

(30) Foreign Application Priority Data

Nov. 30, 2011 (KR) .......................... 10-2011-0127380

(51) Int. Cl.  
*H02J 7/00* (2006.01)  
*H02J 7/04* (2006.01)

(52) U.S. Cl.  
CPC .............. *H02J 7/0021* (2013.01); *H02J 7/044* (2013.01); *H02J 2007/005* (2013.01); *Y02T 10/7055* (2013.01)

(58) Field of Classification Search  
CPC ...... H02J 7/00; H02J 7/0031; H02J 2007/004; H02J 7/044; Y02E 60/012  
USPC ........................................................ 320/134  
See application file for complete search history.

(56) References Cited

U.S. PATENT DOCUMENTS

| | | | |
|---|---|---|---|
| 5,442,335 A * | 8/1995 | Cantin et al. | 340/13.22 |
| 8,478,452 B2 * | 7/2013 | Pratt et al. | 700/297 |
| 2005/0020205 A1 * | 1/2005 | Khoini-Poorfard | 455/23 |
| 2005/0024020 A1 | 2/2005 | Hogari et al. | |
| 2006/0164042 A1 * | 7/2006 | Sim | 320/150 |
| 2009/0134840 A1 * | 5/2009 | Yamamoto et al. | 320/116 |
| 2012/0086400 A1 * | 4/2012 | White et al. | 320/118 |
| 2014/0217982 A1 * | 8/2014 | Ohkawa et al. | 320/118 |

FOREIGN PATENT DOCUMENTS

| | | |
|---|---|---|
| KR | 10-2005-0013972 A | 2/2005 |
| KR | 10-2006-0086024 A | 7/2006 |
| KR | 10-2007-0105220 A | 10/2007 |

* cited by examiner

*Primary Examiner* — Thuan Do  
(74) *Attorney, Agent, or Firm* — Knobbe, Martens, Olson & Bear, LLP

(57) ABSTRACT

A battery pack having a battery management system is disclosed. In some embodiments, the battery pack includes a battery management system, which includes a detector detecting a voltage and a current of each of the battery cells, a current monitor receiving current information detected by the detector, and a controller receiving voltage and current information from the detector and current information from the current monitor, and calculating capacities of the battery cells based on the receive information.

18 Claims, 2 Drawing Sheets

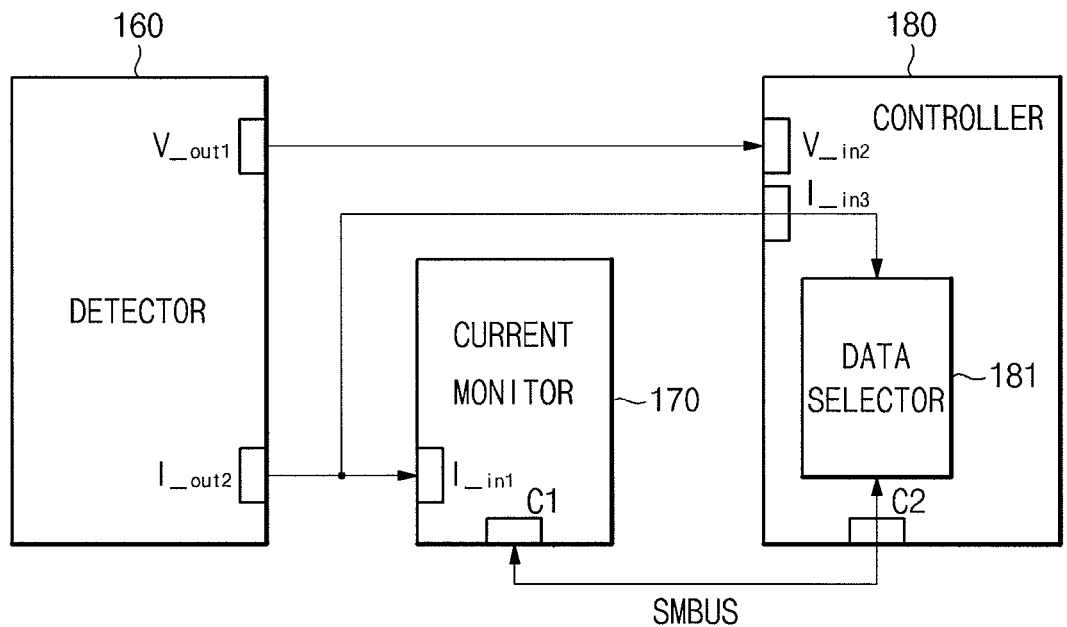
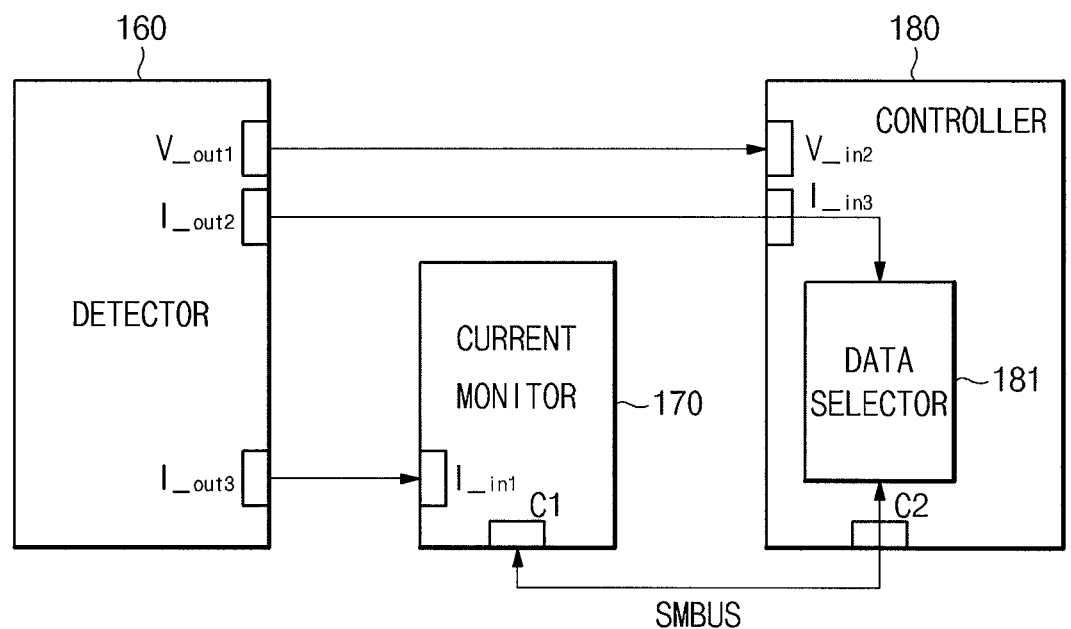
FIG. 3

BATTERY PACK

CROSS-REFERENCE TO RELATED APPLICATIONS

This application claims the benefit of Korean Patent Application No. 10-2011-0127380 filed on Nov. 30, 2011, the contents of which are incorporated herein by reference in their entirety.

BACKGROUND

1. Field

The disclosed technology relates to a battery pack, and more particularly to a battery pack having charging functions controlled according to status information.

2. Description of the Related Technology

In general, rechargeable secondary batteries are widely used for mobile electronic appliances such as cellular phones, notebook computers, camcorders, personal digital assistants (PDA) and the like. In addition, rechargeable secondary batteries are also used for electric vehicles such as e-bikes or e-scooters.

The secondary battery is fabricated in the form of a battery pack including battery cells and a battery management system, and charging or discharging of battery cells are performed by an external power supply or an external load through external terminals in the battery pack. In addition, the battery management system measures values of a voltage and a current, controls a protecting operation of battery cells based on the measured data, calculates a state of charge (SOC), and transmits processed information to the external system.

In a case of an e-bike or an e-scooter, current variations occur abruptly within a very short time. For example, city driving can entail frequent start-stops in traffic. Thus, in order for a battery management system to accurately calculate a battery capacity and to perform protecting operations at the right time, current monitoring should be performed at a high enough frequency to account for current variation in the e-bike or the e-scooter. However, a single chip formed in the battery management system generally implements control of the protection of battery cells and calculation of battery capacity. Thus, if the time for current monitoring is shortened, a current measurement load increases, so that other functions of the single chip cannot be performed. In addition, if the single chip is damaged due to a high current in a high-power system such as an e-bike or an e-scooter, functions of protecting operations and battery capacity calculation may not be possible.

SUMMARY OF CERTAIN INVENTIVE ASPECTS

Various aspects provide a battery pack which can operate stably in a high-power system.

One inventive aspect is a battery pack including one or more battery cells, a charging element and a discharging element configured to respectively control charging and discharging of the battery cells, and a detector configured to detect a voltage and a current of the battery cells. The battery pack also includes a current monitor configured to receive current information detected by the detector, and a controller configured to receive voltage and current information from the detector and current information from the current monitor, where the controller is configured to calculate capacities of the battery cells based on the received information and to control the charging and discharging elements.

Another inventive aspect is a battery management system, configured to control charging and discharging of one or more battery cells. The system includes a detector configured to detect a voltage and a current of the battery cells, a current monitor configured to receive current information detected by the detector, and a controller configured to receive voltage and current information from the detector and current information from the current monitor, where the controller is configured to calculate capacities of the battery cells based on the received information.

BRIEF DESCRIPTION OF THE DRAWINGS

The accompanying drawings are included to provide further understanding of the present disclosure, and are incorporated in and constitute a part of this specification. The drawings illustrate certain embodiments and, together with the description, serve to explain principles of the present disclosure. In the drawings:

FIG. 2 is a circuit diagram illustrating a connection between components of a battery management system shown in FIG. 1; and FIG. 3 is a circuit diagram illustrating another connection between components of a battery management system shown in FIG. 1.

DETAILED DESCRIPTION OF CERTAIN INVENTIVE EMBODIMENTS

Figure 1:
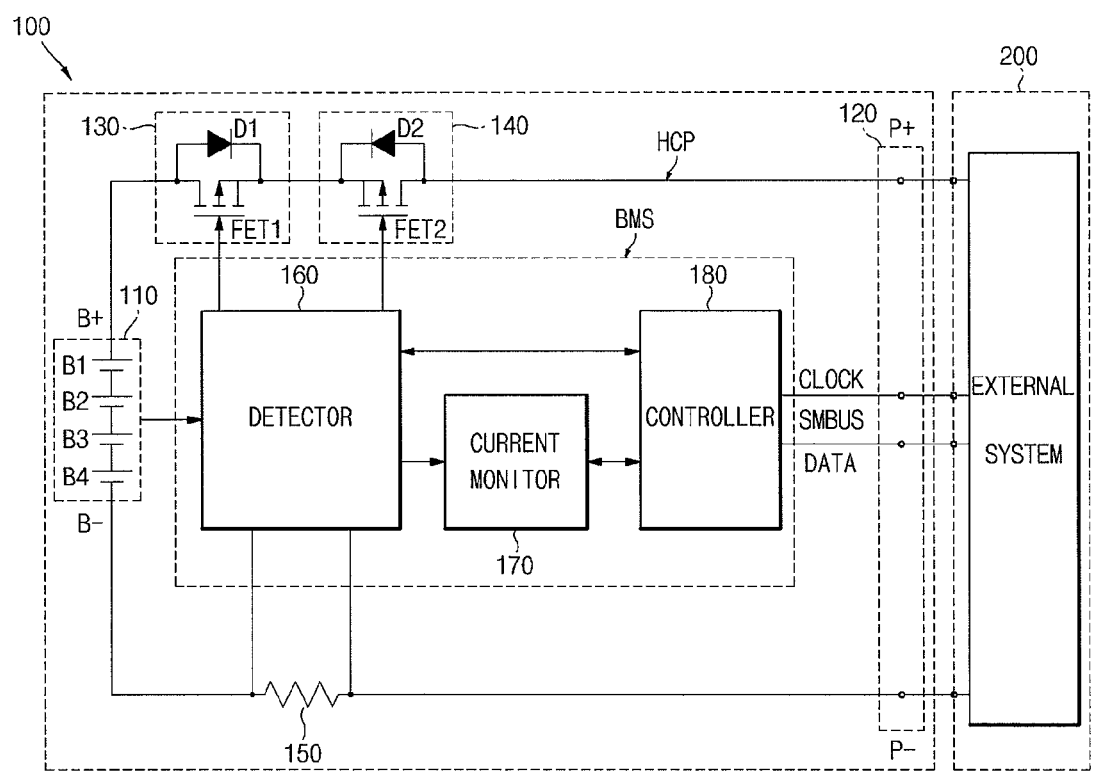
FIG. 1 is a circuit diagram schematically illustrating a configuration of a battery pack according to an embodiment.

Example embodiments are described in more detail with reference to accompanying drawings.

FIG. 1 is a circuit diagram schematically illustrating a configuration of a battery pack according to an embodiment of the present invention. Referring to FIG. 1, the battery pack 100 includes a battery unit 110, an external terminal 120, a charging element 130, a discharging element 140, a sensor resistor 150 and a battery management system (BMS).

The battery pack 100 is connected to an external system 200 through the external terminal 120 and performs a charging or discharging operation. A high current path (HCP) established between the external terminal 120 and the battery unit 110 may be used as a charge/discharge path, and a relatively high current may flow through the HCP. The battery pack 100 may communicate with the external system 200 through a system management bus (SMBUS). For the purpose of communicating with SMBUS, the battery pack 100 may include a clock terminal (CLOCK) and a data terminal (DATA).

The external system 200 may include an external power supply or an external load. That is to say, the external system 200 may be a portable electronic device such as a portable notebook computer, and may include an external power supply such as an adapter (not shown) for supplying power. The battery unit 110 may be charged by the external power supply of the external system 200. If the external system 200 is disconnected from the external power supply and is connected to the external load, discharging from the battery unit 110 to the external load may be performed through the external terminal 120.

The battery unit 110 may include one or more battery cells B1, B2, B3 and B4 and may be charged or discharged to a constant voltage. Symbols B+ and B− shown in FIG. 1 denote high current terminals, which are a positive electrode power supply unit and a negative electrode power supply unit of battery cells B1, B2, B3 and B4 connected in series. While the number of cells of the battery unit 110 is 4, that is, battery cells B1, B2, B3 and B4 are connected in series, the number of battery cells of the battery unit 110 may different, and may be determined, for example, based on power capacity required by the external load.

The external terminal 120 is connected to the battery unit 110 and is connected to the external system 200, serving as a terminal during charging of the battery unit 110 or discharging of the battery unit 110. In FIG. 1, P+ indicates a positive terminal connected to the positive electrode power supply unit (B+) of the battery unit 110, and P− indicates a negative terminal connected to the negative electrode power supply unit (B−) of the battery unit 110. The battery pack 100 is connected to the external power supply or the external load of the external system 200 through the external terminal 120. That is to say, if the external system 200 connected to the external power supply is coupled to the external terminal 120, charging from the external power supply to the battery unit 110 is performed. If the external load of the external system 200 is coupled to the external terminal 120, discharging from the battery unit 110 to the external load is performed.

The charging element 130 and the discharging element 140 are connected in series on the HCP between the battery unit 110 and the external terminal 120, and control charging and discharging of the battery pack 100. Each of the charging element 130 and the discharging element 140 may include a field effect transistor (FET) and a parasitic diode (D). That is to say, the charging element 130 may include a field effect transistor (FET1) and a parasitic diode (D1). A source and a drain of the FET1 of the charging element 130 are connected in a direction opposite to a direction in which a source and a drain of the FET2 of the discharging element 130 are connected. With this configuration, the FET1 of the charging element 130 is connected to limit the flow of current from the external terminal 120 to the battery unit 110, while the FET2 of the discharging element 140 is connected to limit the flow of current from the battery unit 110 to the external terminal 120. Here, the FET1 and FET2 of the charging and discharging elements 130 and 140 may be, but not limited to, switching elements. In some embodiments, electric elements performing other types of switching operations are used instead of FET1 and FET2 of the charging and discharging elements 130 and 140. In addition, the parasitic diodes D1 and D2 of the charging and discharging elements 130 and 140 are configured such that a current may flow in a direction opposite to a direction in which the flow of current is limited.

The sensor resistor 150 is connected in series on the HCP between the battery unit 110 and the external terminal 120. Opposite ends of the sensor resistor 150 may be connected to the detector 160. Accordingly, the sensor resistor 150 may sense charge and discharge currents of the battery unit 110 when the detector 160 detects voltage values of the opposite ends of or across the sensor resistor 150 and a resistance value of the sensor resistor 150. Therefore, the sensor resistor 150 may function to transmit information concerning the charge current or the discharge current of the battery unit 110 to the detector 160.

The BMS includes the detector 160, a current monitor 170 and a controller 180.

The detector 160 is connected to each of the battery cells B1, B2, B3 and B4 and detects voltages of the battery unit 110. In addition, the detector 160 is connected to the sensor resistor 150 and detects charge and discharge currents of the battery unit 110. In addition, the detector 160 may function to operate the charging element 130 and the discharging element 140 under the control of the controller 180. The detector 160 may be implemented, for example, by a protective circuit integrated circuit (IC) or an analog front end (AFE) integrated circuit (IC).

For example, if the external system 200 is an external power supply, the detector 160 sets the FET1 of the charging element 130 to an 'ON' state and the FET2 of the discharging element 140 to an 'ON' state to charge the battery unit 110. Likewise, if the external load of the external system 200 is coupled to the battery unit 110, the detector 160 sets the FET1 of the charging element 130 to an 'ON' state and the FET2 of the discharging element 140 to an 'ON' state to discharge the battery unit 110. Meanwhile, although not shown, the detector 160 may detect voltages of the respective battery cells B1, B2, B3 and B4.

A signal indicative of the voltage or current detected from the detector 160 may be transmitted to the current monitor 170 and the controller 180 as analog signals, and information concerning the transmitted analog signals may be converted into digital information by the current monitor 170 and the controller 180.

The current monitor 170 may receive and store the current information detected from the detector 160 at a predetermined frequency (to be referred to as a first frequency). The first frequency is described below. The current monitor 170 may include a memory (not shown) for storing information. The memory may serve as a buffer. In addition, if the current information received from the detector 160 is an analog signal, the current monitor 170 may include an analog-to-digital (A/D) converter (not shown) for storing digital information. The A/D converter converts the analog current signal received from the detector 160 into a digital signal and stores the digitally converted current signal in the memory.

The controller 180 may receive voltage information and current information from the detector 160 and current information from the current monitor 170, respectively, and may calculate a status or a capacity of the battery unit 110, e.g., a state of charge (SOC), based on the received information. Here, the controller 180 may include a memory (not shown) for storing the information received from the detector 160 or the current monitor 170.

The controller 180 may receive current information from the detector 160 at a predetermined frequency (to be referred to as a second frequency). The second frequency is described below. In addition, the controller 180 may read the current information stored in the memory of the current monitor 170 through SMBUS communication at a predetermined frequency. The frequency of the controller 180 reading the current information from the current monitor 170 may or may not be substantially equal to the frequency of receiving the current information from the detector 160.

The controller 180 may further include a data selector 181 that selects the current information received from the detector 160 or the current information received from the current monitor 170, for example, according to whether the current monitor 170 operates or not.

In some embodiments, the controller 180 reads the current information stored in the memory of the current monitor 170 through SMBUS communication at a predetermined frequency and calculates the capacity of the battery unit 110 based at least in part on the current information. However, when the battery pack 100 is used in a high-power system such as an e-bike or an e-scooter, a high current may flow in the system, so that the current monitor 170 may be damaged, resulting in malfunctioning. In this case, in order to allow the controller 180 to normally operate for calculation of battery capacity, for example, the current information for the battery unit 110, may be received directly from the detector 160. As described above, the data selector 181 determines whether the current information received from the current monitor 170 or the current information received from the detector 160 is to be used according to whether the current monitor 170 operates or not, and selects the current information.

The operation of the data selector 181 is described in more detail. The data selector 181 determines whether the current monitor 170 operates or not, and selectively uses the current information received from the detector 160 or the current monitor 170 based on the determination result.

For example, in a case where the current information is read from the memory (not shown) of the current monitor 170, the data selector 181 determines that the current monitor 170 normally operates, selects the current information read from the current monitor 170 and stores the same in the memory to be used in the controller 180 for calculating the capacity of the battery unit 110.

Conversely, if the current information is not received from the memory (not shown) of the current monitor 170, the data selector 181 determines that the current monitor 170 does not normally operate and selects and stores the current information received from the detector 160. Thus, even in a case where the current monitor 170 does not operate, the charge/discharge current information of the battery unit 110 can be continuously monitored, thereby allowing the controller 180 to perform normal operations.

If the current information received from the detector 160 is an analog signal, the controller 180 may include an A/D converter (not shown) for storing digital information. The A/D converter may convert the analog current signal received from the detector 160 into a digital signal and then store the same in the memory (not shown).

The controller 180 may additionally or alternatively receive voltage information from the detector 160 and may control a protecting operation of the battery unit 110.

For example, if the voltage received from the detector 160 is greater than a preset over-charge level voltage value in the controller 180, the controller 180 may determine an over-charge state, and output an over-charge control signal corresponding to the over-charge state to the detector 160. The detector 160 receives the over-charge control signal from the controller 180 and turns off the FET1 of the charging element 130. Accordingly, charging from the external power supply of the external system 200 to the battery unit 110 is interrupted. Here, even if the FET1 of the charging element 130 is turned off, the parasitic diode D1 of the charging element 130 allows the battery pack 100 to perform discharging.

Conversely, if the voltage received from the controller 180 is not greater than a preset over-charge level voltage value in the controller 180, the controller 180 may determine an over-discharge state, and output an over-discharge control signal corresponding to the over-discharge state to the detector 160. The detector 160 receives the over-discharge control signal from the controller 180 and turns off the FET2 of the discharging element 140. Accordingly, discharging from the battery unit 110 to the external load of the external system 200 may be interrupted. Here, even if the FET2 of the discharging element 140 is turned off, the parasitic diode D2 of the discharging element 140 allows the battery pack 100 to perform charging.

The first frequency and the second frequency are described in more detail.

At the first frequency, the current monitor 160 receives the current signal detected by the detector 160. At the second frequency, the controller 180 receives the current information detected by the detector 160.

The first and second frequencies may or may not be different from each other. In some embodiments, the first frequency is less than the second frequency. In addition, the first frequency may be higher than a current variation frequency of the battery unit 110.

If an e-bike or an e-scooter, for example, is driven, current variation occurs abruptly. For example, if an e-bike is driven, there may be traveling waves and regenerative current waves. A current peak cycle, that is, a current variation cycle, in the traveling waves may be less than, for example, approximately 500 ms, and a current peak cycle in the regenerative current waves may be less than, for example, approximately 20 ms. However, since a current variation cycle of a general controller is longer than that of an e-bike or an e-scooter, it is not possible to detect the current variations. In addition, if a short current measurement time is set in the general controller, a measurement load is increased, thereby preventing the controller 180 from performing basic operations, including battery protection or communication.

The current monitor 170 according to one embodiment of the may repeatedly measure and store the current detected by the detector 160 on a first cycle shorter than a second cycle of the controller 180 and shorter than a current variation cycle in an e-bike or an e-scooter. For example, the first cycle may be set to be in a range of about 5 ms to about 10 ms. In addition, the controller 180 may read the current information stored in the current monitor 170 on a predetermined cycle, perform protection and capacity calculation of the battery unit 110 and transmit the processed information to the external system 200.

FIG. 2 is a circuit diagram illustrating connection relationships between components of a battery management system shown in FIG. 1. Referring to FIG. 2, the detector 160 may include a first output port $V\_{out1}$ and a second output port $I\_{out2}$. The first output port $V\_{out1}$ may be a port for outputting the voltage information detected from the battery unit 110, and the second output port $I\_{out2}$ may be a port for outputting the current information detected from the battery unit 110.

The current monitor 170 may include a first input port and a first communication port C1. Here, the first input port $I\_{in1}$ may be electrically connected to the second output port $I\_{out2}$ and may receive a current signal from the detector 160. The first communication port C1 is a port for outputting the current information stored in the current monitor 170 to the controller 180 and communicating with the controller 180. Here, the first communication port C1 may be connected to a second communication port C2 of the controller 180, which is described below, and may perform system management bus (SMBUS) communication.

The controller 180 may include a second input port $V\_{in2}$, a third input port $I\_{in3}$ and the second communication port C2. The second input port $V\_{in2}$ may be electrically connected to the first output port $V\_{out1}$ of the detector 160 and may receive voltage information from the detector 160. The third input port $I\_{in3}$ may be electrically connected to the second output port $I\_{out2}$ of the detector 160 and a connection node of the first input port $I\_{in1}$ of the current monitor 170 and may directly receive the current information detected from the detector 160. In addition, the third input port $I\_{in3}$ may also be connected to the data selector 181 to allow the current information received from the detector 160 to be transmitted to the data selector 181. The second communication port C2 may be electrically connected to the first communication port C1 of the current monitor 170 to allow, for example, an information request signal of the controller 180 to be transmitted to the current monitor 170, and may receive the current information stored in the current monitor 170 in response to the information request signal.

FIG. 3 is a circuit diagram illustrating another connection relationship between components of a battery management system shown in FIG. 1. Referring to FIG. 3, the detector 160 may include a first output port $V\_{out1}$, a second output port $I\_{out2}$ and a third output port $I\_{out3}$. Here, the first output port $V\_{out1}$ may be a port for outputting the voltage information detected from the battery unit 110 and the second output port $I\_{out2}$ and the third output port $I\_{out3}$ may be ports for outputting the current information detected from the battery unit 110.

The current monitor 170 may include a first input port $I\_{in1}$ and a first communication port C1. Here, the first input port $I\_{in1}$ may be electrically connected to the third output port $I\_{out3}$ and may receive a current signal from the detector 160. The first communication port C1 may be a port for outputting the current information stored in the current monitor 170 to the controller 180 and communicating with the controller 180. Here, the first communication port C1 may be connected to a second communication port C2 of the controller 180, which is described below, and may perform system management bus (SMBUS) communication.

The controller 180 may include a second input port $V\_{in2}$, a third input port $I\_{in3}$ and a second communication port C2. The second input port $V\_{in2}$ may be electrically connected to the first output port $V\_{out1}$ of the detector 160 and may receive voltage information from the detector 160. The third input port $I\_{in3}$ may be electrically connected to the second output port $I\_{out2}$ of the detector 160 and may directly receive the current information detected from the detector 160. In addition, the third input port $I\_{in3}$ may also be connected to the data selector 181 to allow the current information received from the detector 160 to be transmitted to the data selector 181. The second communication port C2 may be electrically connected to the first communication port C1 of the current monitor 170 to allow an information request signal of the controller 180 to be transmitted to the current monitor 170, and may receive the current information stored in the current monitor 170 in response to the information request signal.

According to some embodiments, in a high-power system such as an e-bike or an e-scooter, the current monitor may protect the controller from a high current that flows in the system, thereby allowing the controller to perform normal operations.

In addition, the current monitor can disperse a current measurement load and can monitor a current within a shorter time than a current variation cycle of the high-power system, thereby measuring an instantaneous maximum current value. Accordingly, current measurement errors can be reduced, and more accurate current monitoring is enabled.

Certain embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present disclosure as set forth in the following claims.

What is claimed is:

1. A battery pack comprising:
   one or more battery cells;
   a charging circuit and a discharging circuit configured to respectively control charging and discharging of the battery cells;
   a detector configured to detect a voltage and a current of the battery cells;
   a current monitor configured to receive current information detected by the detector; and
   a controller configured to receive voltage and current information from the detector and current information from the current monitor, wherein the controller is configured to calculate capacities of the battery cells based on the received information and to control the charging and discharging circuits,
   wherein the detector includes a first output port for outputting the voltage information detected from the battery cells, and a second output port for outputting the current information detected from the battery cells, wherein the current monitor includes a first input port connected to the second output port and a first communication port for outputting the current information received from the detector and communicating with the controller, and wherein the controller includes a second input port connected to the first output port, a third input port connected to the second output port, and a second communication port connected to the first communication port.

2. The battery pack of claim 1, wherein the current monitor further comprises a memory to store the current information received from the detector.

3. The battery pack of claim 1, wherein the current monitor receives the current information from the detector at a first frequency, the controller receives the current information from the detector at a second frequency, and the first and second frequencies are different from each other.

4. The battery pack of claim 3, wherein the period associated with the first frequency is shorter than a current variation cycle of each of the battery cells.

5. The battery pack of claim 1, wherein the current monitor receives the current information from the detector at a first frequency, the controller receives the current information from the detector at a second frequency, and the first frequency is greater than the second frequency.

6. The battery pack of claim 5, wherein the period associated with the first frequency is shorter than the current variation cycle of each of the battery cells.

7. The battery pack of claim 1, wherein the controller further comprises a data selector configured to select the current information received from the current monitor or the current information received from the detector according to whether the current monitor operates or not.

8. The battery pack of claim 7, wherein the data selector selects the current information received from the current monitor if the current monitor operates, and selects the current information received from the detector if the current monitor does not operate.

9. A battery pack comprising:
   one or more battery cells;
   a charging circuit and a discharging circuit configured to respectively control charging and discharging of the battery cells;
   a detector configured to detect a voltage and a current of the battery cells;
   a current monitor configured to receive current information detected by the detector; and
   a controller configured to receive voltage and current information from the detector and current information from the current monitor, wherein the controller is configured to calculate capacities of the battery cells based on the received information and to control the charging and discharging circuits,
   wherein the detector includes a first output port for outputting the voltage information detected from the battery cells and second and third output ports for outputting the current information detected from the battery cells, wherein the current monitor includes a first input port connected to the third output port, and a first communication port for outputting the current information received from the detector and communicating with the controller, and wherein the controller includes a second input port connected to the first output port, a third input port connected to the second output port and a second communication port connected to the first communication port.

10. A battery management system, configured to control charging and discharging of one or more battery cells, the system comprising:

a detector configured to detect a voltage and a current of the battery cells;

a current monitor configured to receive current information detected by the detector; and a controller configured to receive voltage and current information from the detector and current information from the current monitor, wherein the controller is configured to calculate capacities of the battery cells based on the received information, wherein the detector includes a first output port for outputting the voltage information detected from the battery cells, and a second output port for outputting the current information detected from the battery cells, wherein the current monitor includes a first input port connected to the second output port and a first communication port for outputting the current information received from the detector and communicating with the controller, and wherein the controller includes a second input port connected to the first output port, a third input port connected to the second output port, and a second communication port connected to the first communication port.

11. The system of claim 10, wherein the current monitor further comprises a memory to store the current information received from the detector.

12. The system of claim 10, wherein the current monitor receives the current information from the detector at a first frequency, the controller receives the current information from the detector at a second frequency, and the first and second frequencies are different from each other.

13. The system of claim 12, wherein the period associated with the first frequency is shorter than a current variation cycle of each of the battery cells.

14. The system of claim 10, wherein the current monitor receives the current information from the detector at a first frequency, the controller receives the current information from the detector at a second frequency, and the first frequency is greater than the second frequency.

15. The system of claim 14, wherein the period associated with the first frequency is shorter than the current variation cycle of each of the battery cells.

16. The system of claim 10, wherein the controller further comprises a data selector configured to select the current information received from the current monitor or the current information received from the detector according to whether the current monitor operates or not.

17. The system of claim 16, wherein the data selector selects the current information received from the current monitor if the current monitor operates, and selects the current information received from the detector if the current monitor does not operate.

18. A battery management system, configured to control charging and discharging of one or more battery cells, the system comprising:

a detector configured to detect a voltage and a current of the battery cells;

a current monitor configured to receive current information detected by the detector; and a controller configured to receive voltage and current information from the detector and current information from the current monitor, wherein the controller is configured to calculate capacities of the battery cells based on the received information, wherein the detector includes a first output port for outputting the voltage information detected from the battery cells and second and third output ports for outputting the current information detected from the battery cells, wherein the current monitor includes a first input port connected to the third output port, and a first communication port for outputting the current information received from the detector and communicating with the controller, and wherein the controller includes a second input port connected to the first output port, a third input port connected to the second output port and a second communication port connected to the first communication port.

* * * * *